Oct. 31, 1961  J. C. WESTMONT  3,006,428
MOTOR VEHICLE DRIVING AND WEIGHT DISTRIBUTION ARRANGEMENT
Filed April 15, 1958
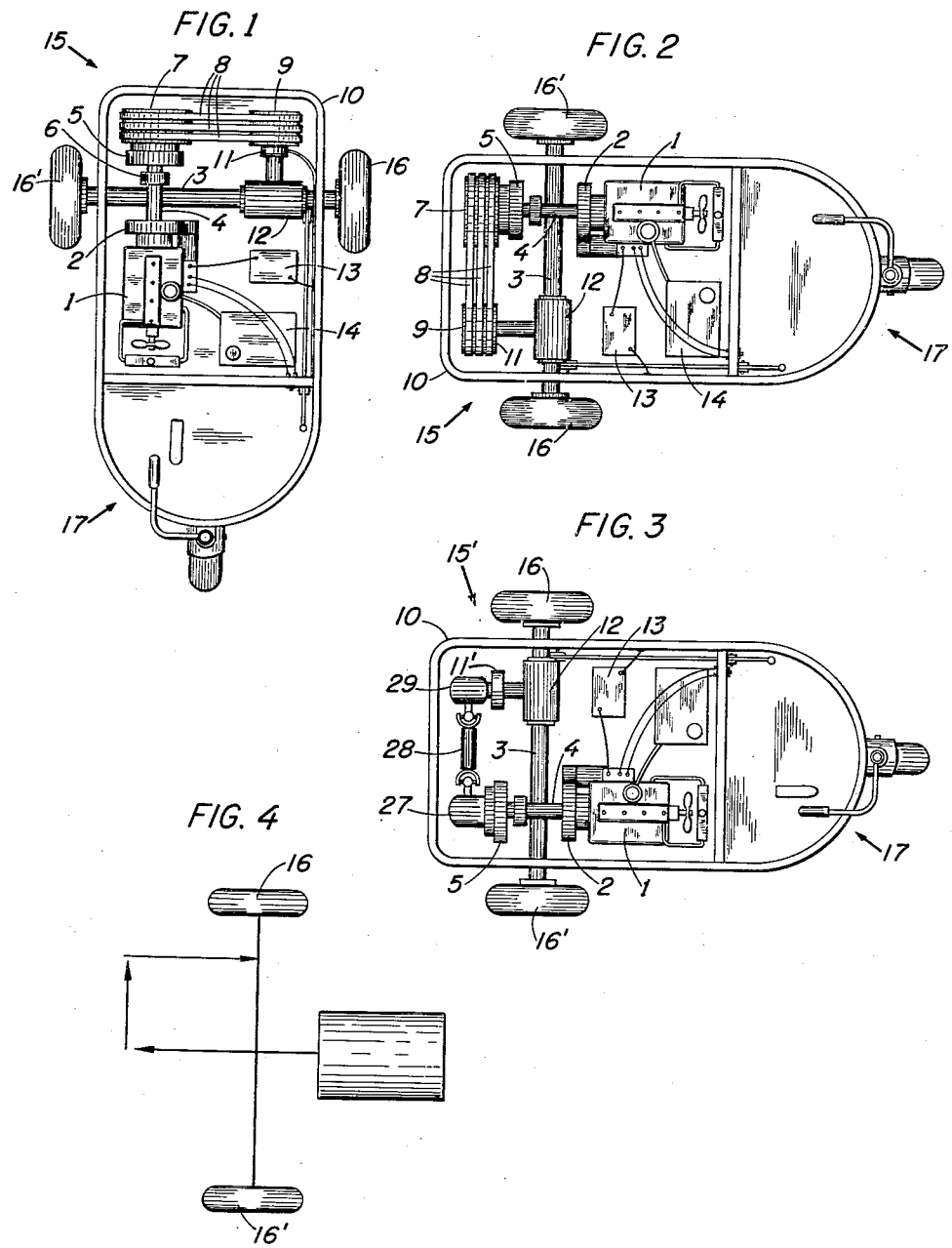
INVENTOR.
JOHN C. WESTMONT
BY
Attorney

United States Patent Office

3,006,428
Patented Oct. 31, 1961

3,006,428
MOTOR VEHICLE DRIVING AND WEIGHT DISTRIBUTION ARRANGEMENT
John C. Westmont, 2308 Kendall Ave., Madison, Wis.
Filed Apr. 15, 1958, Ser. No. 728,686
4 Claims. (Cl. 180—54)

This invention relates to a new and novel driving arrangement for motor vehicles and more particularly to novel placement of the engine, clutch, brake, transmission and differential of a motor vehicle.

Heretofore, small motor driven vehicles such as golf carts and self-propelled lawn mowers have been overly cumbersome and inefficient in operation due primarily to the bulk of the vehicle and the improper weight distribution of the driving mechanism of the vehicle.

The weight distribution on small or large motor vehicles is very important to the maintenance of balance and traction of the vehicle especially when the vehicle is traveling in uneven or hilly terrain. It is known that small vehicles such as golf carts and lawn mowers and the like are subjected to rough, uneven and hilly terrain and it is therefore imperative that the vehicle be well balanced.

Therefore, an object of the present invention is to provide a driving arrangement for a motor vehicle which allows for provision of optimum weight distribution in a vehicle, thereby decreasing the bulk of the vehicle sufficiently to enable the vehicle to be constructed in a minimum of space.

Another object is to provide a driving arrangement for motor vehicles which will render motor vehicles much less cumbersome than those heretofore in use.

Another object is to provide a driving arrangement for a motor vehicle which will lower the center of gravity of the motor vehicle and thereby increase the stability of the vehicle, particularly on turns.

Another object is to provide a driving arrangement which is greatly simplified over that used heretofore.

Another object is to provide a driving arrangement for motor vehicles which will lower construction costs on motor vehicles.

Further objects will become apparent from the drawings and from the following detailed description in which it is intended to illustrate the applicability of the invention without thereby limiting its scope to less than that of all equivalents which will be apparent to one skilled in the art. In the drawings like reference numerals refer to like parts and:

FIGURE 1 is a plan view of my invention;

FIGURE 2 is a plan view of another embodiment of my invention;

FIGURE 3 is a plan view of another embodiment of my invention; and

FIGURE 4 is a schematic view of my invention.

Referring now more particularly to the drawings, in which like numerals refer to like parts, FIGURE 1 is a plan view of a motor vehicle indicated generally as 15 embodying one of my driving arrangements comprising the placement of a power unit such as internal combustion engine 1, a flywheel 2, a drive axle 3, a drive shaft 4, clutch 5, a coupling 6 between drive shaft 4 and clutch 5, a V-belt sheave 7 situated on a clutch such as centrifugal clutch 5, a brake 11, a V-belt sheave 9 situated around brake 11, a plurality of V-belts 8 extending between V-belt sheaves 7 and 9, a transmission and differential 12, a battery 13 and a gas tank 14 within a chassis 10 of motor vehicle 15 and two driven wheels 16 and 16' without chassis 10.

As shown in FIGURE 1 the forward portion of motor vehicle 15 is indicated generally as 17 and engine 1 is situated in the right forward portion of the chassis 10 and power from the engine 1 with flywheel 2 is transmitted rearwardly by means of drive shaft 4 located above drive axle 3 to flexible coupling 6 situated rearward of drive axle 3. The power from engine 1 in turn is transmitted from flexible coupling 6 rearward to centrifugal clutch 5. Centrifugal clutch 5 controls and empowers V-belt sheave 7 situated to the rear thereof and the power is transmitted by means of a plurality of V-belts 8 from V-belt sheave 7 to an opposing V-belt sheave 9 situated at the left rear portion of chassis 10. The aforementioned V-belt sheave 9 may contain and be rotatably and continuously associated with a brake 11 controlled by a pedal means through a fluid line. From sheave 9 power is transmitted forward with respect to chassis 10 to the transmission and differential 12 then to axle 3 and finally to wheels 16 and 16', said differential being affixed to a housing (not shown) around axle 3. It may be seen that the power as it leaves engine 1 follows a course which has the form of a loop with respect to the right side portion of axle 3. The battery 13 and gas tank 14 as shown in FIGURE 1 are situated in the front portion of chassis 10 adjacent engine 1. However battery 13, gas tank 14 and engine are all situated forward of drive axle 3.

It may be seen that the arrangement above described allows for an optimum of balance of the component part of a motor vehicle and in turn lends to the vehicle a maximum amount of maneuverability and stability in a minimum amount of space.

FIGURE 2 is the mirror image or inverse of FIGURE 1 and shows a motor vehicle indicated generally as 15 embodying one of my driving arrangements comprising the placement of a power unit such as internal combustion engine 1, a clutch 5, a brake 11, and a transmission and differential 12. As shown in FIGURE 2 internal combustion engine 1 situated in the front left portion of chassis 10 immediately forward of drive axle 3 and adjacent the right side of motor vehicle chassis 10. Power is transmitted from said engine 1 rearwardly by means of drive shaft 4 located above drive axle 3 to centrifugal clutch 5. The power is then transmitted from V-belt sheave 7 by means of a plurality of V-belts 8 to an opposing V-belt sheave 9, said V-belts 8 connecting sheaves 7 and 9 and being at a right angle to sheaves 7 and 9. V-belts 8 are situated parallel to the rear of chassis 10. V-belt sheave 9 may contain and be rotatably and continuously associated with a brake 11 controlled by means not shown. Power is transmitted from sheave 9 to the transmission and differential 12 then to axle 3 and finally to wheels 16 and 16'. It may be seen that FIGURE 2 as FIGURE 1 shows the power transmitted from the power unit 1 to form a loop with respect to the left portion of drive axle 3. As in FIGURE 1 the battery 13 and gas tank 14 are situated in the forward portion of chassis 10 adjacent power unit 1. However, instead of being on the left they are situated on the right front portion. Also as shown the battery 13, gas tank 14 and power unit 1 are all situated forward of drive axle 3.

FIGURE 3 is a plan view of another embodiment of a motor vehicle indicated generally as 15' embodying one of my driving arrangements comprising the placement of component parts such as a power unit such as internal combustion engine 1, a flywheel 2, a drive shaft 4, a clutch 5, gear boxes 27 and 29 with drive shaft 28 extending between gear boxes 27 and 29, a brake 11', a transmission and differential 12, a drive axle 3, a battery 13 and a gas tank 14 within the chassis 10 of a motor vehicle 15, the forward portion of which is indicated generally as 17. As shown in FIGURE 3, the engine 1 with flywheel 2 attached is situated in the front right portion of chassis 10 immediately forward of drive axle 3. Power is transmitted from power unit 1 rearwardly to the flexible coupling 6 situated rearward of drive axle 3 and then to clutch 5 by means of drive shaft 4 located above drive axle 3. Clutch 5 controls and empowers gear box 27 situated to the rear thereof and the power is transmitted by means of a drive shaft 28 from box 27 to gear box 29 situated at the left rear portion of chassis 10. Gear box 29 may contain brake 11' controlled by pedal means.

The power in turn is transmitted forward from box 29 to transmission and differential 12 situated adjacent drive axle 3. As in FIGURE 1 the power is transmitted from the transmission and differential to drive axle 3 and as the power is transmitted from engine 1 to axle 3 it forms a loop with respect to the right portion of drive axle 3.

FIGURE 4 shows a schematic view of the direction in which the power is transmitted in my driving arrangement. As indicated in FIGURES 1, 2 and 3 the power is transmitted rearward from power unit 1 to the rear of axle 3 to clutch 5 situated in the right rear of chassis 10. As shown in FIGURES 1 and 3 on the right rear of chassis 10, the power is transmitted from clutch 5 laterally across chassis 10 to brake 11 and forward from brake 11 to transmission and differential 12 and the power is then transmitted laterally on drive axle 3 to form a loop after leaving the power unit 1 with respect to the right portion of the drive axle 3.

The figures have shown the driving arrangement utilizing a V-belt driving means and drive shaft driving means for connecting the various component parts of a motor vehicle, however it is within the contemplation of this invention that other means of connecting and driving the component parts may be used while retaining the new and novel arrangement of component parts set out and described in the figures. In the figures reference has been made to an ordinary clutch, brake and power unit, it, however, may be seen that there are modifications in the components parts that would be equally as operable and practical as those described. For example a centrifugal clutch for this specific design of motor vehicle may be preferable to a mechanical clutch however a mechanical clutch would be operable. Also a hydraulic brake would be perhaps the preferred design brake for this driving arrangement however in specific situations an air or electric brake may be equally or more practical.

Small vehicles heretofore have usually been powered with an internal combustion engine however in certain specific situations it may be desirable to have small vehicles powered by electric power, atomic power, or powered by other means.

Having thus disclosed my invention I claim:

1. In combination with a motor vehicle chassis and motor vehicle drive axle, a drive arrangement comprising a power unit, a clutch, a brake, a transmission and a differential, with means for transmitting power between said power unit and said clutch, brake, transmission and differential, said power unit situated immediately forward of said drive axle and adjacent one side of said motor vehicle chassis, said clutch situated to the rear of said power unit and also to the rear of said drive axle with power transmitted between said power unit and said clutch, said brake situated to the rear of said drive axle on the opposing side of said chassis from said clutch with power transmitted between said clutch and said brake, said transmission and differential situated adjacent to said drive axle immediately forward of said brake and on the opposing side of said chassis from said power unit and said clutch, with power transmitted between said brake and said transmission and differential and with power transmitted between said transmission and differential and said drive axle.

2. The machine of claim 1 wherein said power unit is situated adjacent the right side of said motor vehicle chassis.

3. The machine of claim 1 wherein power is transmitted between said clutch and said brake by means of a drive shaft.

4. The machine of claim 1 wherein power is transmitted between said clutch and said brake by two sets of gears with an extendable driveshaft having at least one universal joint therebetween.

References Cited in the file of this patent

UNITED STATES PATENTS

| | | |
|---|---|---|
| 1,903,694 | Burney | Apr. 11, 1933 |
| 2,132,450 | Wolf | Oct. 11, 1938 |
| 2,207,447 | Viles et al. | July 9, 1940 |
| 2,322,477 | Sjoberg | June 22, 1943 |
| 2,406,797 | Buckendale | Sept. 3, 1946 |
| 2,531,268 | Herrington | Nov. 21, 1950 |
| 2,697,491 | Burrus et al. | Dec. 21, 1954 |
| 2,791,912 | Bixby | May 14, 1957 |
| 2,800,037 | Czuba et al. | July 23, 1957 |

FOREIGN PATENTS

| | | |
|---|---|---|
| 774,348 | Great Britain | May 8, 1957 |